US012745705B2

(12) United States Patent
Duquesne et al.

(10) Patent No.: US 12,745,705 B2
(45) Date of Patent: Sep. 29, 2026

(54) DUAL GRAIN CAMERA FOR A CLEAN GRAIN TRANSPORTER OF A COMBINE HARVESTER CLEANING SYSTEM

(71) Applicant: CNH Industrial Belgium N.V., Zedelgem (BE)

(72) Inventors: Frank R.G. Duquesne, Zwevegem (BE); Thomas Mahieu, West-Vleteren (BE)

(73) Assignee: CNH Industrial Belgium N.V. (BE)

( * ) Notice: Subject to any disclaimer, the term of this patent is extended or adjusted under 35 U.S.C. 154(b) by 352 days.

(21) Appl. No.: 18/519,284

(22) Filed: Nov. 27, 2023

(65) Prior Publication Data

US 2024/0172590 A1 May 30, 2024

(30) Foreign Application Priority Data

Nov. 28, 2022 (EP) .................................... 22210034

(51) Int. Cl.
*A01D 41/127* (2006.01)
*A01D 61/00* (2006.01)
*A01F 12/46* (2006.01)

(52) U.S. Cl.
CPC ..... *A01D 41/1272* (2013.01); *A01D 41/1277* (2013.01); *A01D 61/00* (2013.01); *A01F 12/46* (2013.01)

(58) Field of Classification Search
CPC .... A01D 41/00–41/16; A01D 41/1272; A01D 41/1277; A01F 12/46
See application file for complete search history.

(56) References Cited

U.S. PATENT DOCUMENTS

| | | | | |
|---|---|---|---|---|
| 1,615,334 A * | 1/1927 | Macgregor | ........ | A01D 41/1208 198/530 |
| 6,350,197 B1 * | 2/2002 | Cooksey | ................ | A01F 12/46 460/119 |

(Continued)

FOREIGN PATENT DOCUMENTS

| | | |
|---|---|---|
| EP | 2401906 A1 | 1/2012 |
| EP | 3072383 A1 | 9/2016 |

(Continued)

OTHER PUBLICATIONS

Extended European Search Report for European Application No. 22210034.9, dated May 26, 2023, 7 pages.

*Primary Examiner* — Tara Schimpf
*Assistant Examiner* — Madeline I Runco
(74) *Attorney, Agent, or Firm* — Buchanan Ingersoll & Rooney PC

(57) ABSTRACT

A cleaning system includes cleaning sieves for separating grain kernels from grain chaff, clean grain collectors arranged below respective ones of the at least two cleaning sieves for receiving the separated grain kernels therefrom, and a clean grain transporter coupled to the grain collectors and arranged to receive the separated grain kernels from the grain collectors and transport the grain kernels towards a grain storage. The clean grain transporter is configured to simultaneously facilitate a first crop stream including primarily grain kernels coming from a first one of the clean grain collectors and a second crop stream including primarily grain kernels coming from another one of the clean grain collectors. A camera system captures an image of a sample of the grain kernels in the first crop stream and an image of a sample of the grain kernels in the second crop stream.

13 Claims, 6 Drawing Sheets

(56) References Cited

U.S. PATENT DOCUMENTS

| | | | | |
|---|---|---|---|---|
| 6,669,558 | B1 * | 12/2003 | Wolters | A01F 12/52 460/14 |
| 7,690,973 | B2 * | 4/2010 | Becker | A01F 12/46 460/114 |
| 7,833,091 | B2 * | 11/2010 | Holtmann | A01F 12/46 460/119 |
| 8,635,840 | B2 | 1/2014 | Behnke | |
| 9,955,629 | B2 * | 5/2018 | Vandevelde | A01D 61/04 |
| 10,070,590 | B2 * | 9/2018 | Missotten | A01F 12/446 |
| 10,257,984 | B2 * | 4/2019 | Coppinger | A01F 12/46 |
| 2011/0072773 | A1 | 3/2011 | Schroeder et al. | |
| 2014/0050364 | A1 * | 2/2014 | Brueckner | G06V 20/68 382/110 |
| 2014/0200057 | A1 * | 7/2014 | Farley | A01F 12/446 460/100 |
| 2016/0189007 | A1 * | 6/2016 | Wellington | G06V 20/695 382/110 |
| 2016/0198629 | A1 * | 7/2016 | Duquesne | A01D 41/1276 701/36 |
| 2017/0112065 | A1 * | 4/2017 | Reinecke | A01F 12/44 |
| 2018/0263198 | A1 * | 9/2018 | Bertino | A01B 69/008 |
| 2020/0084966 | A1 * | 3/2020 | Corban | H04N 23/54 |
| 2020/0084967 | A1 * | 3/2020 | Corban | A01D 41/1277 |
| 2021/0378176 | A1 * | 12/2021 | Leenknegt | G05D 1/0088 |
| 2021/0400871 | A1 * | 12/2021 | Fischer | G06T 7/0002 |
| 2022/0132736 | A1 * | 5/2022 | Meyers | A01D 41/1273 460/7 |
| 2022/0264796 | A1 * | 8/2022 | Inoue | A01F 12/18 |

FOREIGN PATENT DOCUMENTS

| | | | |
|---|---|---|---|
| EP | 2747546 | B1 | 3/2017 |
| WO | 2006010761 | A1 | 2/2006 |
| WO | 2016077588 | A1 | 5/2016 |
| WO | 2020222159 | A1 | 11/2020 |
| WO | 2021086607 | A1 | 5/2021 |

* cited by examiner

DUAL GRAIN CAMERA FOR A CLEAN GRAIN TRANSPORTER OF A COMBINE HARVESTER CLEANING SYSTEM

CROSS REFERENCE TO RELATED APPLICATION

This application claims priority to European Application No. 22210034.9, filed Nov. 28, 2022, the content of such application being incorporated by reference herein in its entirety.

FIELD OF THE INVENTION

The present invention relates to a cleaning system comprising at least two cleaning sieves for separating grain kernels from grain chaff, at least two clean grain collectors, arranged below respective ones of the at least two cleaning sieves for receiving the separated grain kernels therefrom, and a clean grain transporter, coupled to the at least two grain collectors and arranged to receive the separated grain kernels from the at least two grain collectors and transport the grain kernels towards a grain storage. The present invention further relates to a combine harvester comprising such a cleaning system.

BACKGROUND OF THE INVENTION

Combine harvesters, also simply called combines, are complex driving agricultural machinery comprising a variety of mechanical tools for reaping grain crops from a field, feeding the reaped crop into the crop processing core of the combine, threshing the grain, and separating the threshed grain from the straw and other non-grain material. In most combine harvesters, a cleaning system is provided for separating the chaff from the grain kernels. The cleaned grain is then transported from the cleaning system to a grain tank wherein the grain is temporarily stored until the grain tank is unloaded into a trailer or at a grain storage facility.

The cleaning system typically comprises one or more sieves that are moved in a reciprocating manner while a fan blows air through the sieves from below. The light chaff is blown out to the rear of the machine while the heavier grain kernels fall through the sieve openings. The reciprocating movement, the sieve opening, and the fan speed are typically adjustable to optimise the cleaning operation such that grain losses are low while only minimal amounts of chaff end up in the grain tank. Typically, the cleaning system comprises a so-called pre-cleaning with a pre-sieve, followed by a main cleaning with an upper sieve and a lower sieve. In most combine harvesters, all grain kernels falling through any of the sieves are collected by a common clean grain auger that brings the clean grain to a grain elevator. In EP 2 747 546 B1, which is incorporated by reference herein, the cleaning system comprises separate clean grain augers for the pre-cleaning and the main cleaning sections. Grain from both clean grain augers is transported to a single shared grain elevator.

Various sensors may be used for monitoring the performance of the cleaning system. Such sensors may, e.g., include grain loss sensors or pressure sensors. Sometimes, a camera system is used to determine how much chaff or other non-grain material is contained in the grain that is transported from the sieves to the grain tank. The use of a camera system for capturing image of the harvested grain, downstream of the cleaning system has been described in, e.g., WO 2006/010761 A1, which is incorporated by reference herein. Such camera systems have since been used for measuring an amount of chaff and other non-grain material in the grain that is elevated towards the grain tank. The amount of non-grain material in the cleaned grain is a good measure for the performance of the cleaning system. The use of a such camera systems allows an operator or an automated control system to adapt one or more operational settings of the cleaning system based on the measured cleaning system performance.

It would be desirable to further improve the performance of the cleaning system.

SUMMARY OF THE INVENTION

According to an aspect of the invention there is provided a cleaning system comprising at least two cleaning sieves, two clean grain collectors, a clean grain transporter and a camera system. The cleaning sieves are provided for separating grain kernels from grain chaff. The at least two clean grain collectors are arranged below respective ones of the two cleaning sieves and receive the separated grain kernels therefrom. The clean grain transporter is coupled to the at least two grain collectors and receives the separated grain kernels therefrom. The clean grain transporter then transports the grain kernels towards a grain storage. The clean grain transporter is configured such that it simultaneously facilitates a first crop stream comprising primarily grain kernels coming from a first one of the at least two clean grain collectors and a second crop stream comprising primarily grain kernels coming from a second one of the at least two clean grain collectors. The camera system is configured for capturing an image of a sample of the grain kernels in the first crop stream and an image of a sample of the grain kernels in the second crop stream.

By separately collecting and transporting the cleaned grain coming from the first and second cleaning sieves, it is made possible to not just obtain a good measure for the performance of the cleaning system as a whole, but to monitor and control the performance of individual sieves or combinations of sieves too. Analysing the image of the sample of the grain kernels in the first crop stream provides information about the cleaning performance of the first cleaning sieve. Analysing the image of the sample of the grain kernels in the second crop stream provides information about the cleaning performance of the second cleaning sieve. Based on this information, the operator or an automated control system may independently adapt one or more operational settings of one or both cleaning sieves. Consequently, a more precise and effective control of the cleaning system is possible, and its overall performance is enhanced.

It is noted that with primarily grain kernels from the first or second clean grain collector, it is meant that 100 percent separation of the two crop streams is not needed. In some embodiments, it may be possible for the first and second crop streams to contain only grain kernels coming from, respectively, the first and second grain collectors. However, as long as a large majority of the grain in each captured image comes from one of the two grain collectors, meaningful information about the performance of the associated cleaning sieve can be obtained. A large majority is herein to be interpreted as, for example, at least 70%, 80, 90%, 95%, or 99%.

In an embodiment of the cleaning system according to the invention, the clean grain transporter is arranged such that the first and second crop streams are physically separated at least up to a point where the images of the samples are captured. In a large and complex machine like a combine harvester, driving over uneven fields at relatively high speeds while shaking and rotating many functional parts, the physical separation may not completely avoid some grain kernels from the first grain collector ending up in the second crop stream, or vice versa. However, the physical separation of the two crop streams in the clean grain transporter, at least up to the point where the images are captured, ensures that the images provide an accurate representation of the content of the respective crop streams. As a result, individual performance indicators of the separate sieves can be determined with high accuracy. After the point where the images are taken, the two crop streams may be combined into one, for example to allow for a more compact design and/or a higher grain transport capacity.

The camera system may comprise two separate cameras, a first one of the two separate cameras being arranged to capture the image of the sample of the grain kernels in the first crop stream and a second one of the two separate cameras being arranged to capture the image of the sample of the grain kernels in the second crop stream. This brings the advantage that previously available cameras and image processing software can be used, and that the camera system can easily be exchanged with other cleaning system that do not have these two separate crop streams.

Alternatively, the camera system may comprise a single camera arranged to capture the images of the samples of the grain kernels in the first and the second crop streams. This single camera may be arranged to simultaneously capture the images of the samples of the grain kernels in the first and the second crop streams. For example, a single wide view camera may be used for this purpose. Software or electronics used for processing the captured images in order to derive useful information therefrom may, for example, relate specific portions of the captured images to the first crop stream and other portions to the second crop stream.

In other embodiments, the camera system may be arranged to alternately capture the images of the samples of the grain kernels in the first and the second crop streams. This may, for example, be realised by moving or rotating the camera between images, or by doing the same with a mirror that is installed in the optical path between the camera and the grain sample. Alternatively, a bypass is provided for temporarily holding the grain kernels while the image is captured, and a mechanical arrangement alternately allows grain kernels from the first and second crop streams to fill the bypass.

The camera system may, for example, comprise a digital 2D camera or a 1D line scan camera. Continuously or repeatedly using a 1D line scan camera while the grain kernels move past the line observed by the camera will allow the camera system to obtain a 2D image. Also a camera registering additionally depth information can be used, for example by making multiple pictures with the same camera but with different illumination, for example different wave lengths and/or angles for the illumination, or by extracting phase information from the pictures, or by making multiple pictures with the same or another camera in slightly different positions with respect to the observed sample.

In preferred embodiments of the cleaning system according to the invention, the clean grain transporter comprises a clean grain elevator. The camera system may be arranged to capture images of the grain samples while the grain moves through the grain elevator. One or more bypasses may be provided for temporarily holding the grain kernels while the image is captured. The clean grain transporter may comprise at least two augers, arranged between respective ones of the at least two clean grain collectors and the clean grain elevator. The at least two augers are preferably coupled to respective separate grain inlets of the clean grain elevator. For example, the clean grain elevator comprises a left-side grain entrance and a right-side grain entrance, each coupled to a respective one of the at least two augers. It has been shown in tests that when the two crop streams arrive at the clean grain elevator as separate crop streams, the two crop streams may remain largely separated while being transported upwards by the clean grain elevator. This separation of the two crop streams may even be maintained without providing any special means for physically separating them inside the clean grain elevator.

In some embodiments, the clean grain elevator comprises grain paddles for carrying the grain kernels towards the grain storage, and at least some of the grain paddles comprise a paddle divider for physically separating the first and second crop streams. The height and width of the paddle divider may be such that two completely separate compartments are created and no mixing of grain from the two crop streams is possible. Lower and/or shorter paddle dividers may be used to allow for at least some mixing in the event that one crop stream is larger than the other crop stream. This may help to prevent an uneven mechanical load on the paddles or a reduction in grain handling capacity when one of the streams outweighs the other stream.

Preferably, the cleaning system further comprises a controller operatively coupled to the camera system and the at least two cleaning sieves, the controller being configured to adapt an operational setting of the first one of the at least two cleaning sieves in dependence of the image of the sample of the grain kernels in the first crop stream and to adapt an operational setting of the second one of the at least two cleaning sieves in dependence of the image of the sample of the grain kernels in the second crop stream. This allows for a fully independent control of the two sieves in dependence on their observed individual performance.

BRIEF DESCRIPTION OF THE DRAWINGS

Embodiments of the invention will now be described by way of example with reference to the accompanying drawings, in which.

DETAILED DESCRIPTION OF THE PREFERRED EMBODIMENTS

Figure 1:
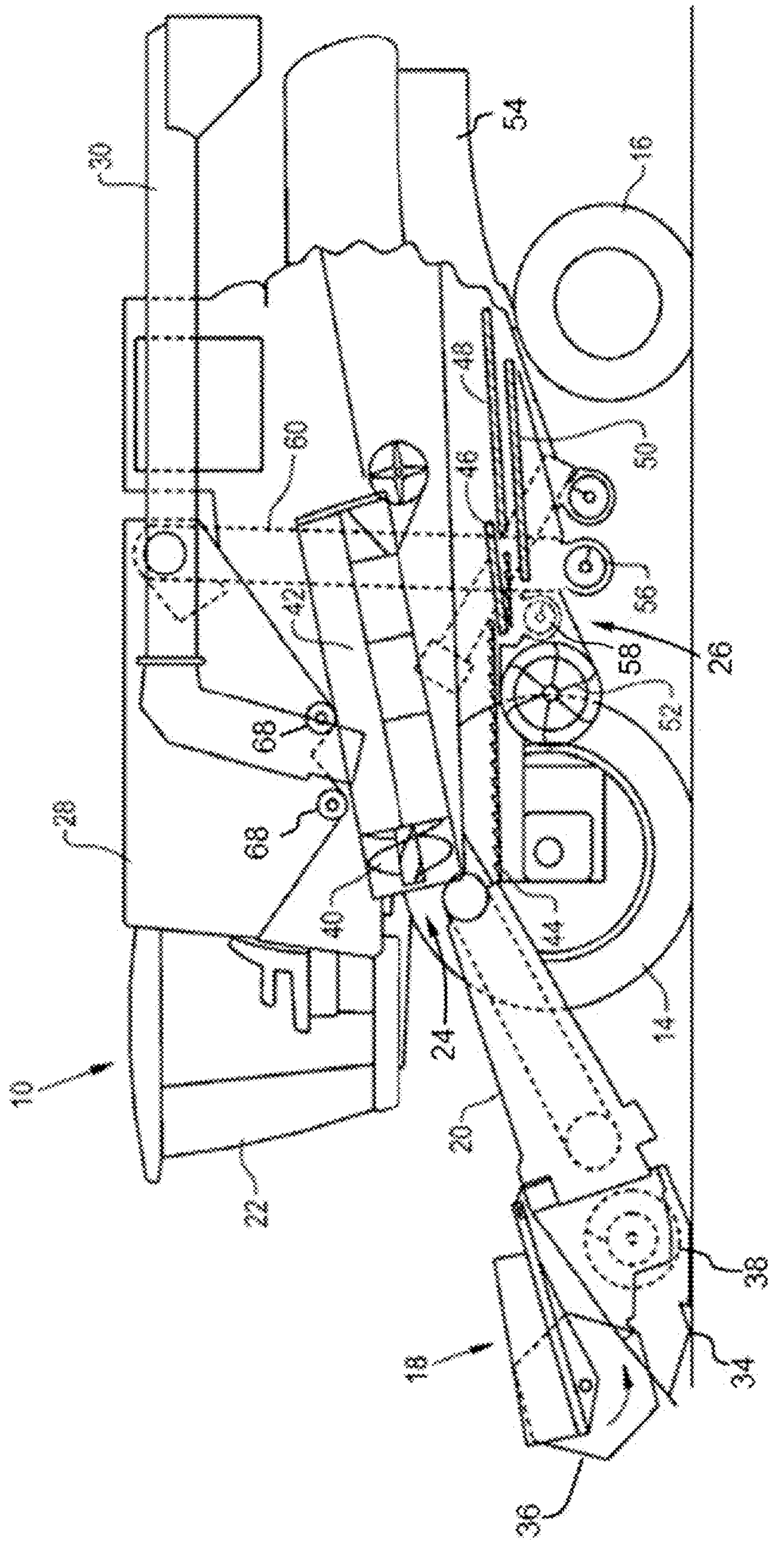
FIG. 1 schematically shows a combine harvester with an embodiment of the cleaning system according to the invention.

FIG. 1 schematically shows an agricultural harvester in the form of a combine harvester 10. The combine harvester 10 generally includes front and rear round engaging wheels 14, 16, a header 18, a feeder 20, an operator cabin 22, a threshing and separation system 24, a cleaning system 26, a grain tank 28 and an unloading tube 30.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separation system 24.

The threshing and separation system 24 comprises a threshing rotor 40 at least partially located and rotatable within a threshing concave 42. The threshing concave may take the form of a perforated concave. Grain from the severed crop is threshed and separated from the material other than grain (MOG) by the action of the threshing rotor 40 within the threshing concave 42. Larger elements of MOG, such as stalks and leaves do not pass through the perforations in the threshing concave 42 and are discharged from the rear of the combine harvester 10. Grain and smaller elements of MOG (small MOG henceforth), such as chaff, dust and straw are small enough to pass through the perforations in the threshing concave 42 and are then discharged from the threshing and separation system 24.

Grain and small MOG that has successfully passed the threshing and separation system 24 falls onto a preparation pan 44 and is conveyed towards the cleaning system 26. The cleaning system 26 comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

In addition to the clean grain auger 56 provided below the lower sieve, the combine harvester 10 of FIG. 1 comprises a further clean grain auger 58 that is positioned below the pre-cleaning sieve 46. The additional clean grain auger 58 increases the grain handling capacity of the cleaning system 26, without having to over dimension the clean grain auger 56 under the lower sieve.

Figure 2:
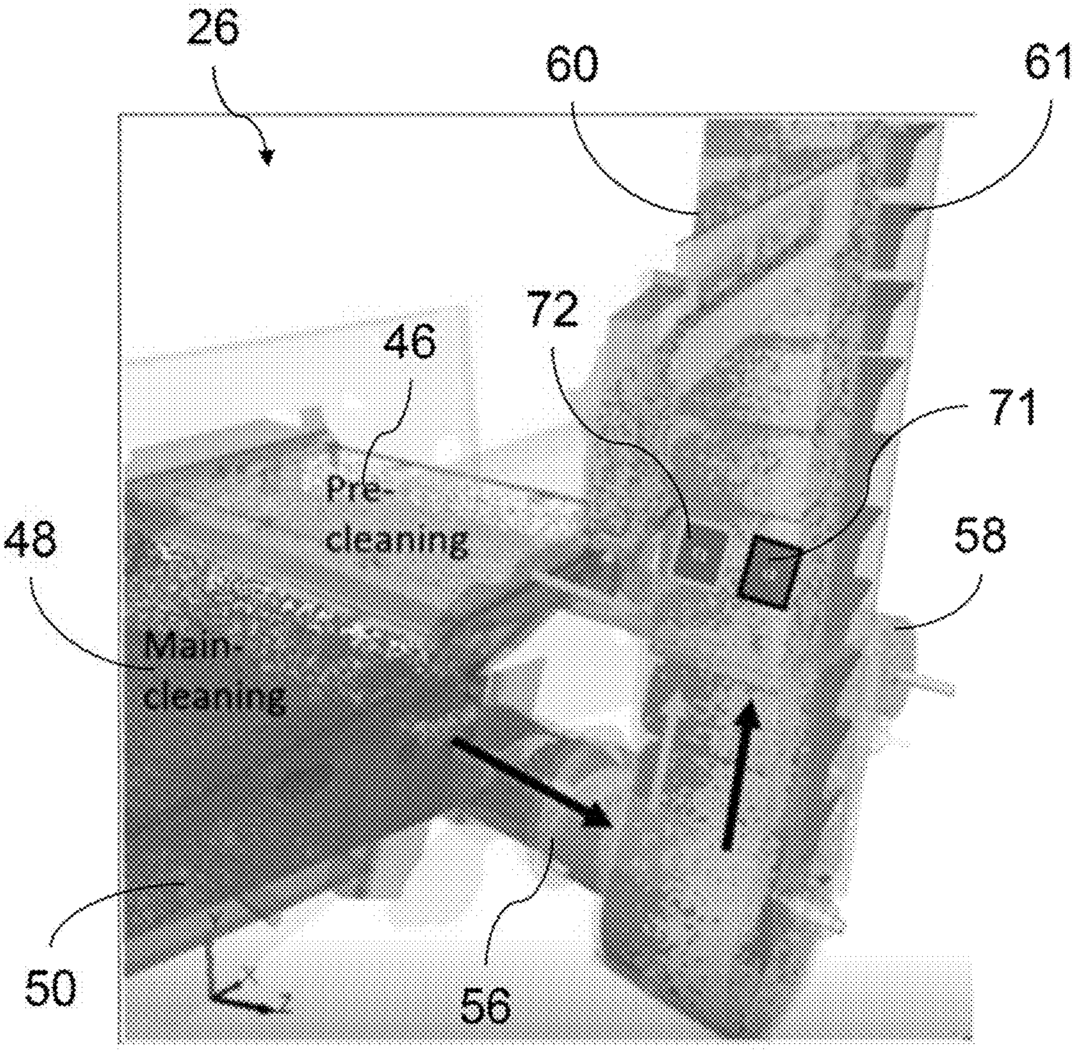
FIG. 2 shows a perspective view of an embodiment of the cleaning system according to the invention.

FIG. 2 shows a perspective view of an embodiment of the cleaning system 26 according to the invention. As can be seen in this figure the main clean grain auger 56 brings the grain collected in a grain collector below the lower sieve 50 to the bottom of the clean grain elevator 60. The additional clean grain auger 58 brings the grain collected in a grain collector below the pre-sieve 46 to a grain elevator inlet that is provided at a more upstream point at the rear of the clean grain elevator. In the embodiment shown here, the main clean grain auger 56 connects to the left side of the clean grain elevator 60 while the additional clean grain auger 58 connects to the right side. Of course, the particular arrangement of connections between the two clean grain augers 56, 58 and the clean grain elevator 60 are just provided as an example and may be different in other embodiments. Also, other embodiments may have three or more clean grain augers for delivering cleaned grain from different zones of the cleaning systems to the clean grain elevator 60.

The clean grain elevator 60 comprises a chain loop 64 with paddles 61 attached thereto that scoop up the clean grain delivered by the clean grain augers 56, 58 and transport it upward towards the grain tank 28. After handing over the elevated clean grain to the grain tank 28, or to a further transport mechanism for moving the grain to the grain tank, the paddles 61 continue their loop downwards to the bottom of the clean grain elevator 60 where new grain will be picked up.

Tests and simulations have shown that when one clean grain auger 56 delivers its grain at a left-side inlet and the other clean grain auger 58 delivers its grain at a right-side clean grain inlet, the two separate crop streams remain mostly separated on the way up, towards the grain tank 28. While some mixing of grain from the two crop streams may occur in a small region of overlap at the middle of the paddles 61, the regions to the right and left thereof primarily contain crop material originating from a single crop stream. It is noted that the term primarily does not require a complete, 100 percent separation of the two crop streams. Especially closer to the centre of the paddle 61, some mixing of the two crop streams may occur. However, at the point where the camera system 71, 72 captures images of the crop stream, at least a large majority of the grain comes from one of the two clean grain augers 56, 58. A large majority is herein to be interpreted as, for example, at least 70%, 80, 90%, 95%, or 99%.

In the embodiment shown in FIG. 2, the camera system comprises a first grain camera 71 and a second grain camera 72. Each grain camera 71, 72 is arranged to capture images of grain samples of one of the two crop streams. By separately collecting and transporting the cleaned grain coming from the pre-cleaning section and the main cleaning section, it is made possible to not just obtain a good measure for the performance of the cleaning system 26 as a whole, but to monitor and control the performance of individual sieves 46 or combinations of sieves 48, 50 too. Analysing the image of the sample of the grain kernels in the first crop stream provides information about the cleaning performance of the pre-cleaning sieve 46. Analysing the image of the sample of the grain kernels in the second crop stream provides information about the cleaning performance of the upper and lower sieves 48, 50. Based on this information, the operator or an automated control system may independently adapt one or more operational settings of one or more cleaning sieves 46, 48, 50. Consequently, a more precise and effective control of the cleaning system 26 is possible, and its overall performance is enhanced.

With modern 2D digital cameras 71, 72, it is possible to capture to clear and high-quality images of the grain while it is moving upwards in the clean grain elevator 60. Therefore, the grain cameras 71, 72 are preferably arranged at a housing of the clean grain elevator 60 itself. In other embodiments, one or more bypasses may be provided for collecting the grain samples that can then be pictured while being at rest. For example, separate bypasses may be provided for each crop stream. Alternatively, a single bypass may be equipped with a special mechanism for alternately taking in samples of one of the two crop streams.

Another way to alternately capture the images of the samples of the grain kernels in the two separate crop streams may, for example, involve moving or rotating a single camera between images, or doing the same with a mirror that is installed in the optical path between the camera and the grain sample.

Alternatively, the camera system may comprise just a single 2D digital camera (not shown) arranged to simultaneously capture the images grain kernels in both crop streams. For example, a single wide view camera may be used for this purpose. Software or electronics used for processing the captured images in order to derive useful information therefrom may, for example, relate specific portions of the captured images to the first crop stream and other portions to the second crop stream.

Figure 3:
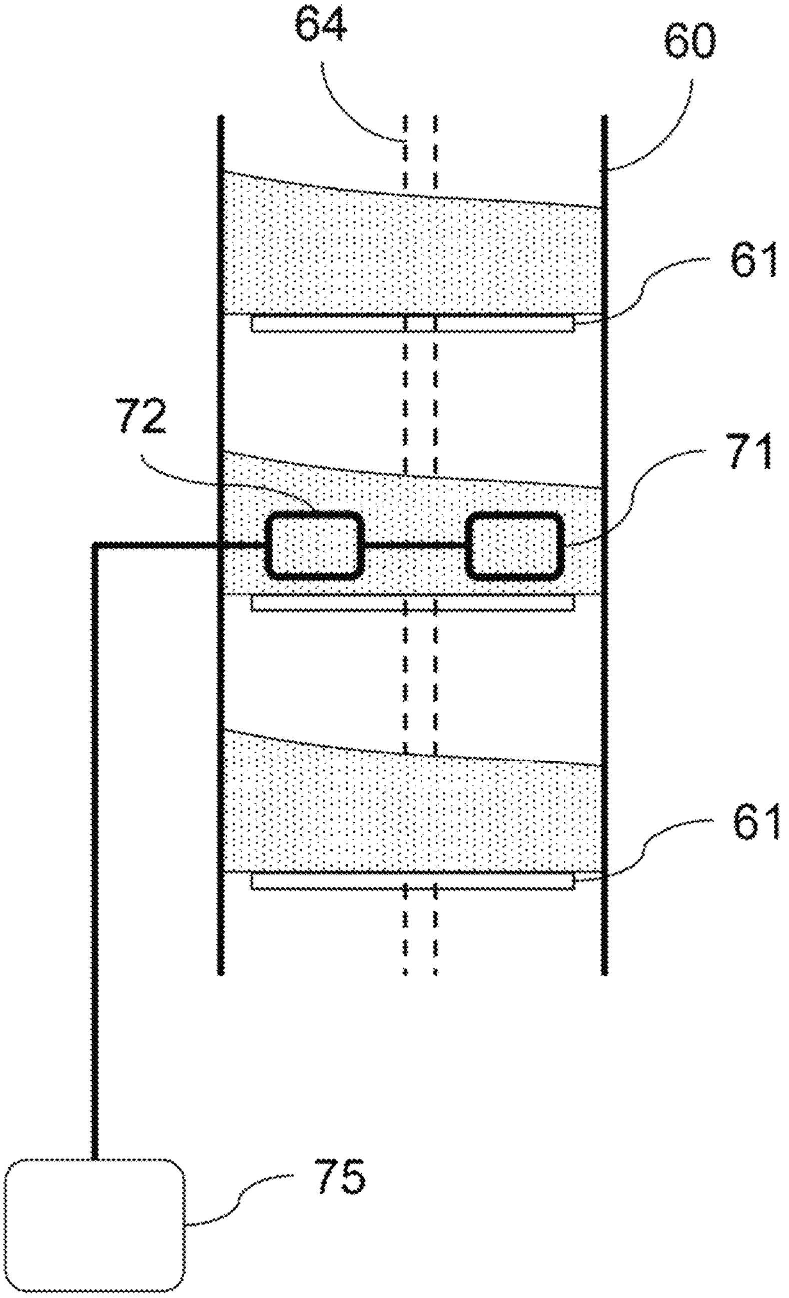
FIG. 3 shows a cross section of part of a clean grain elevator of an embodiment according to the invention.

FIG. 3 shows a cross section of part of a clean grain elevator 60 of an embodiment according to the invention. In this cross section, the grain elevator 60 is viewed from the front. As can be seen in this cross section, the grain elevator 60 comprises a chain 64 to which paddles 61 are attached. The chain is looped around the grain elevator 60 to pull the paddles 61 up on the front side and bring them back down at the back. On the way up, grain is elevated from the point where it is received from one of the clean grain augers 56, 58, to the top of the elevator where it may be handed over to the grain tank 28 or a further auger that moves the grain to the grain tank 28.

On the way up, the two grain cameras 71, 72, described above with reference to FIG. 2 capture images of the grain. A controller 75 is operatively coupled to the cameras 71, 72 and processes the captured images to determine an amount of chaff and/or other non-grain material in the grain sample. Because each camera 71, 72 looks at only one of the two crop streams, separate chaff levels or MOG levels can be determined for the grain coming from the pre-sieve 46 and from the main sieves 48, 50. The same controller 75, or a different controller coupled thereto, is configured to adapt one or more operational settings of the cleaning system 26 in dependence of captured images and the information derived therefrom. For example, sieve openings, fan speeds, air flow adjusting means like valves, vanes or flaps, or the trajectory and frequency of the reciprocating motion of the sieves may be adapted to enhance the cleaning performance of just the pre-cleaning section, just the main cleaning section, or both. With the cleaning system 26, it is possible to fully independently control different sieves 46, 48, 50 in dependence on their observed individual performance.

Figure 4:
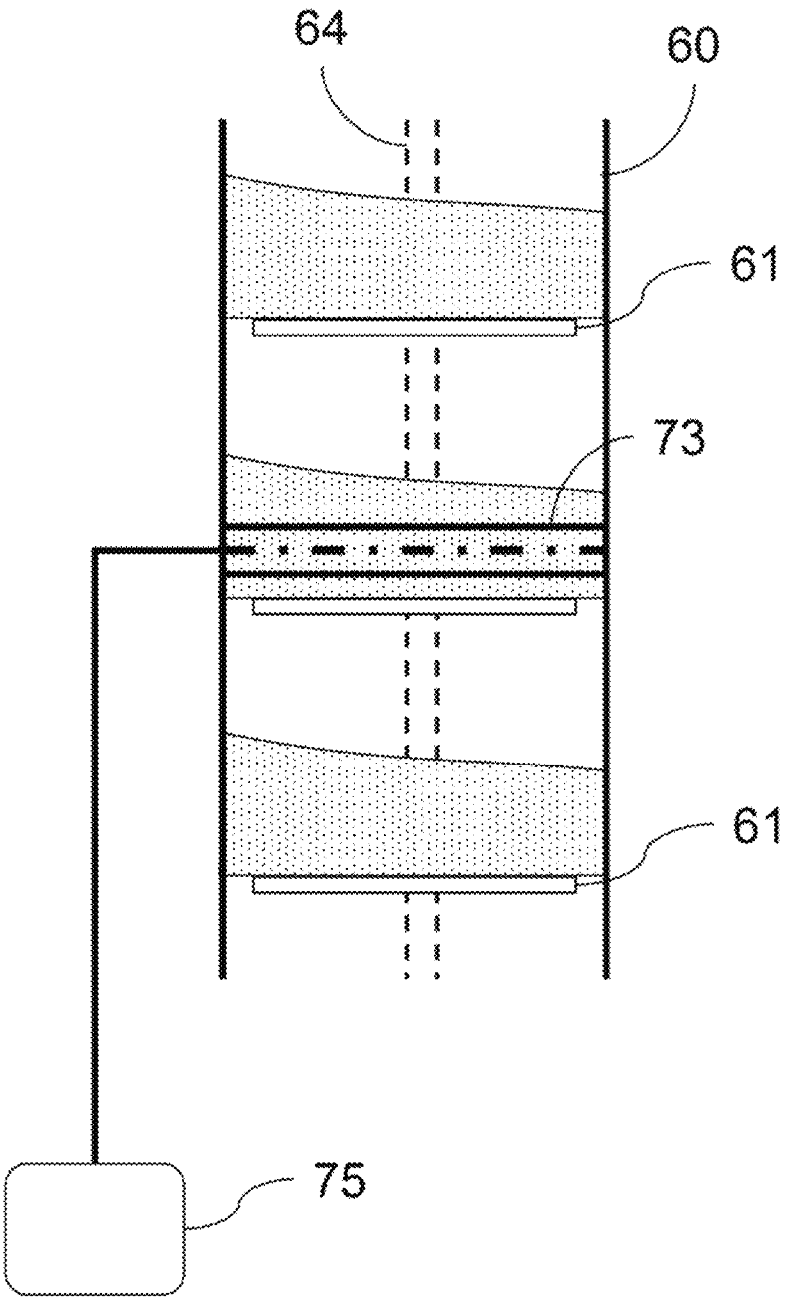
FIGS. 4 to 6 show cross sections of part of a clean grain elevator of other embodiments according to the invention.
Figure 5:
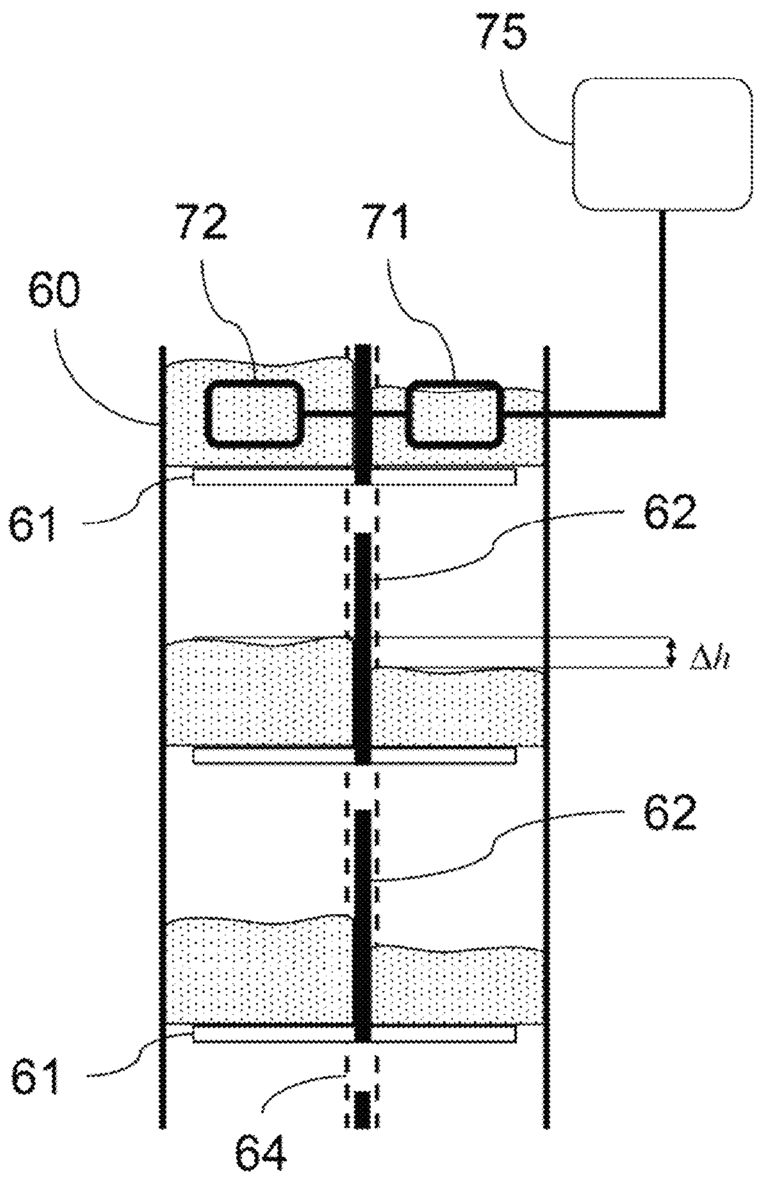
Figure 6:
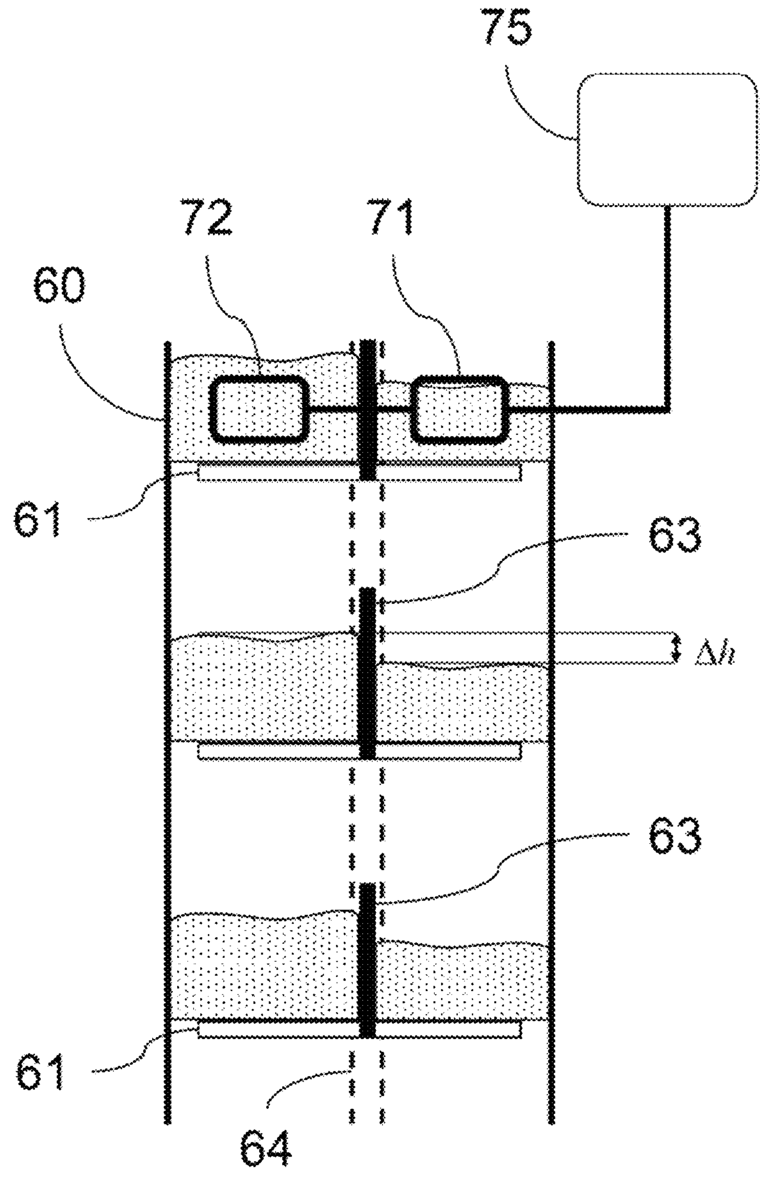

FIGS. 4 to 6 show cross sections of part of a clean grain elevator of other embodiments according to the invention. In the embodiment of FIG. 4, for example, a 1D line scan camera 73 is used to monitor the content of the two crop streams. Continuously or repeatedly using such a 1D line scan camera 73 while the grain kernels move past the line observed by the camera 73 allows the controller 75 to construct a 2D image from which relevant information concerning the elevated crop is obtained. The line scan camera 73 of FIG. 4 has a wide field of view that covers both crop streams. Alternatively, two separate line scan cameras with a smaller field of view may be used, one for monitoring each crop stream.

In both FIG. 3 and FIG. 4, it can be seen that the paddles 61 carry more grain on one side than on their other side. This may happen when the cleaning system 26 is configured such that one crop stream is larger than the other crop stream. The resulting uneven loading of the grain paddles 61, may lead to increased wear of the grain elevator 60. The difference in crop volume between the two crop streams can be observed in the images captured by the camera system. In embodiments of the invention, settings of the cleaning system may be controlled to ensure that equal volumes of grain are delivered by both crop streams. For example, when more grain is coming from the pre-sieve 46 than from the main sieves 48, 50, the sieve openings of the pre-sieve may be reduced to restore the balance.

Inside, the grain elevator 60, gravity may cause some grain from a higher volume crop stream to slide to the other side. When this happens, this will lead to increased mixing of crop material from both crop streams, and it will be more difficult to detect the imbalance. In the embodiments shown in FIGS. 5 and 6, paddle dividers 62, 63 are used to ensure that the two crop streams remain separated inside the grain elevator 60. The height and width of the paddle dividers 62 may be such that two completely separate compartments are created and no mixing of grain from the two crop streams is possible (FIG. 5). In other embodiments, lower and/or shorter paddle dividers 63 may be used (FIG. 6). Lower paddle dividers 63 may allow for at least some mixing to prevent an uneven mechanical load on the paddles or a reduction in the total grain handling capacity when one of the streams far outweighs the other one.

What is claimed is:

1. A cleaning system comprising:

at least two cleaning sieves that separate grain kernels from grain chaff;

at least two clean grain collectors arranged below respective cleaning sieves of the at least two cleaning sieves that receive the separated grain kernels therefrom;

a clean grain transporter coupled to the at least two grain collectors and arranged to receive the separated grain kernels from the at least two grain collectors and transport the grain kernels towards a grain storage, wherein the clean grain transporter simultaneously facilitates transport of a first crop stream comprising grain kernels coming from a first one of the at least two clean grain collectors and a second crop stream comprising grain kernels coming from a second one of the at least two clean grain collectors; and a camera system being arranged that alternately captures an image of a sample of the grain kernels in the first crop stream and an image of a sample of the grain kernels in the second crop stream, the camera system comprising at least one camera.

2. The cleaning system of claim 1, wherein the clean grain transporter is arranged such that the first and second crop streams are physically separated at least up to a point where the images of the samples are captured.

3. The cleaning system of claim 1, wherein the at least one camera comprises two separate cameras, a first camera of the two separate cameras being arranged that captures the image of the sample of the grain kernels in the first crop stream and a second camera of the two separate cameras being arranged that captures the image of the sample of the grain kernels in the second crop stream.

4. The cleaning system of claim 1, wherein the camera system is arranged in simultaneously capturing the images of the samples of the grain kernels in the first and the second crop streams.

5. The cleaning system of claim 1, wherein the camera system comprises a line scan camera.

6. The cleaning system of claim 1, wherein the clean grain transporter comprises a clean grain elevator.

7. The cleaning system of claim 6, wherein the clean grain transporter comprises at least two augers arranged between respective ones of the at least two clean grain collectors and the clean grain elevator.

8. The cleaning system of claim 7, wherein the at least two augers are coupled to respective separate grain inlets of the clean grain elevator.

9. The cleaning system of claim 8, wherein the clean grain elevator comprises a left-side grain entrance and a right-side grain entrance, each grain entrance being coupled to a respective one of the at least two augers.

10. The cleaning system of claim 6, wherein the clean grain elevator comprises grain paddles that carry the grain kernels towards the grain storage; and wherein at least some of the grain paddles comprise a paddle divider that physically separates the first and second crop streams.

11. The cleaning system of claim 1, further comprising:

a controller operatively coupled to the camera system and the at least two cleaning sieves;

wherein the controller adapts an operational setting of a first cleaning sieve of the at least two cleaning sieves based on the image of the sample of the grain kernels in the first crop stream and adapts an operational setting of a second cleaning sieve of the at least two cleaning sieves based on the image of the sample of the grain kernels in the second crop stream.

12. A combine harvester, the combine harvester comprising:

a cleaning system that comprises:

at least two cleaning sieves that separate grain kernels from grain chaff;

at least two clean grain collectors arranged below respective cleaning sieves of the at least two cleaning sieves that receive the separated grain kernels therefrom;

a clean grain transporter coupled to the at least two grain collectors and arranged to receive the separated grain kernels from the at least two grain collectors and transport the grain kernels towards a grain storage, the clean grain transporter simultaneously facilitates transport of a first crop stream comprising grain kernels coming from a first one of the at least two clean grain collectors and a second crop stream comprising grain kernels coming from a second one of the at least two clean grain collectors; and a camera system being arranged that alternately captures an image of a sample of the grain kernels in the first crop stream and an image of a sample of the grain kernels in the second crop stream, the camera system comprising at least one camera.

13. A method of operating a cleaning system of an agricultural vehicle, the method comprising:

adapting an operational setting of a first cleaning sieve of at least two cleaning sieves of the cleaning system that separates grain kernels from grain chaff based on a first image of a sample of the grain kernels in a first crop stream being transported by a clean grain transporter that is:

coupled to a first grain collector arranged below the first cleaning sieve, and arranged to receive separated grain kernels from the first grain collector and transport the grain kernels towards a grain storage; and adapting an operational setting of a second cleaning sieve of the at least two cleaning sieves based on a second image of a sample of the grain kernels in a second crop stream being transported by the clean grain transporter that is:

coupled to a second grain collector arranged below the second cleaning sieve, and arranged to receive separated grain kernels from the second grain collector and transport the grain kernels towards the grain storage;

wherein the first image and the second image are captured by a camera system being arranged that alternately captures the first image and the second image, the camera system comprising at least one camera.

* * * * *